Sheet. 1 3 Sheets.
W. N. Whiteley, Jr
Harvester Rake.
No. 98
No. 1203
Reissued Jun. 25, 1861.
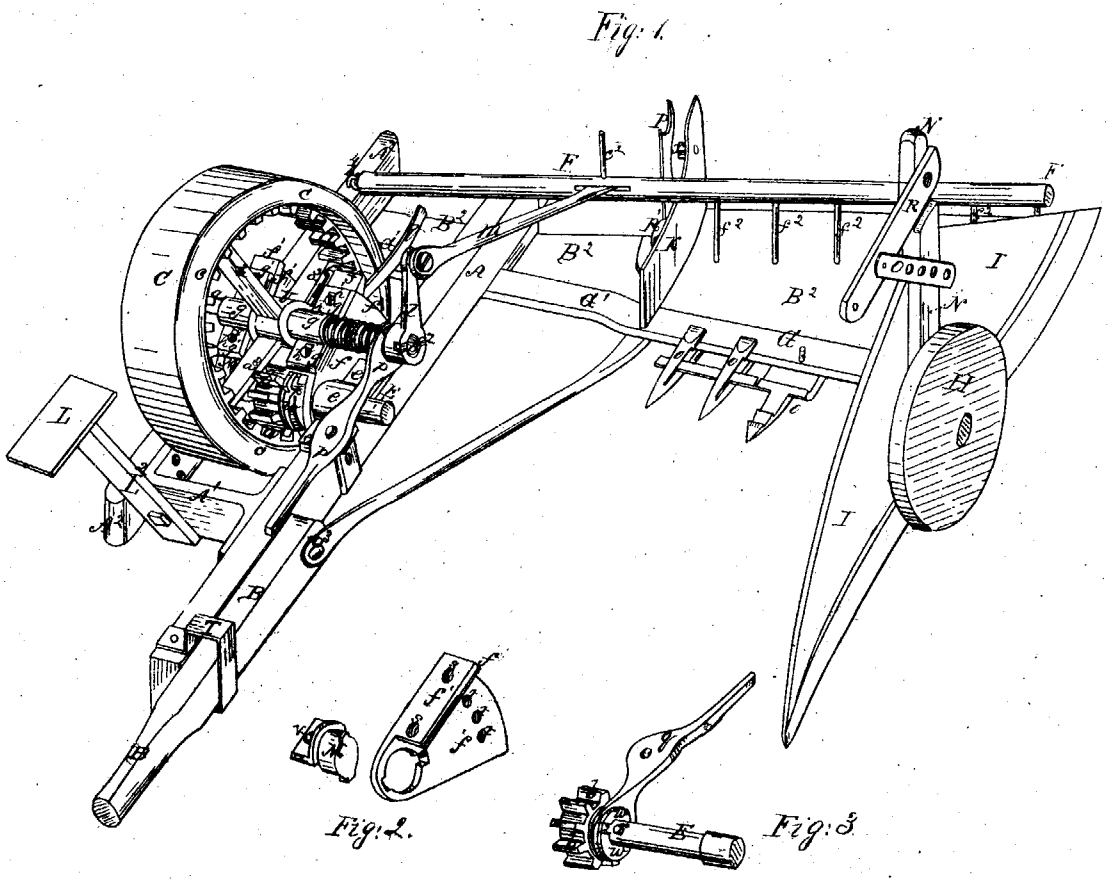
Witnesses.
Reuben Miller
Sol J. Houck
Inventor.
William N. Whiteley, jun

W. N. Whiteley, Jr.
Harvester Rake.
No. 98
No. 1203
Reissued Jun. 25, 1861.
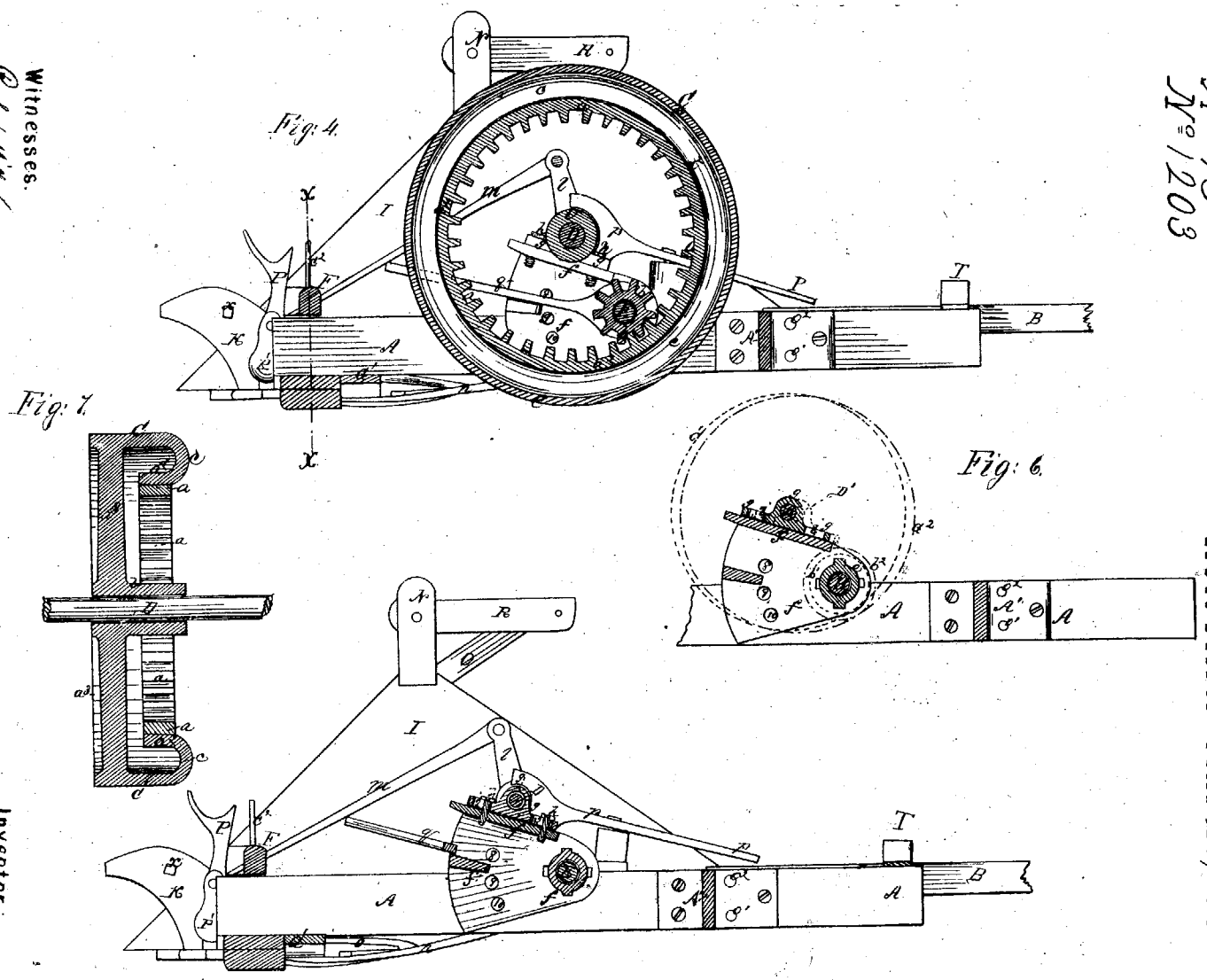
Witnesses.
Reuben Miller
Sol G. Howell
Inventor.
William N. Whiteley, Jr.

W. N. Whiteley, Jr.
Harvester Rake.
No. 98
No. 1203
Reissued Jun. 25, 1861.
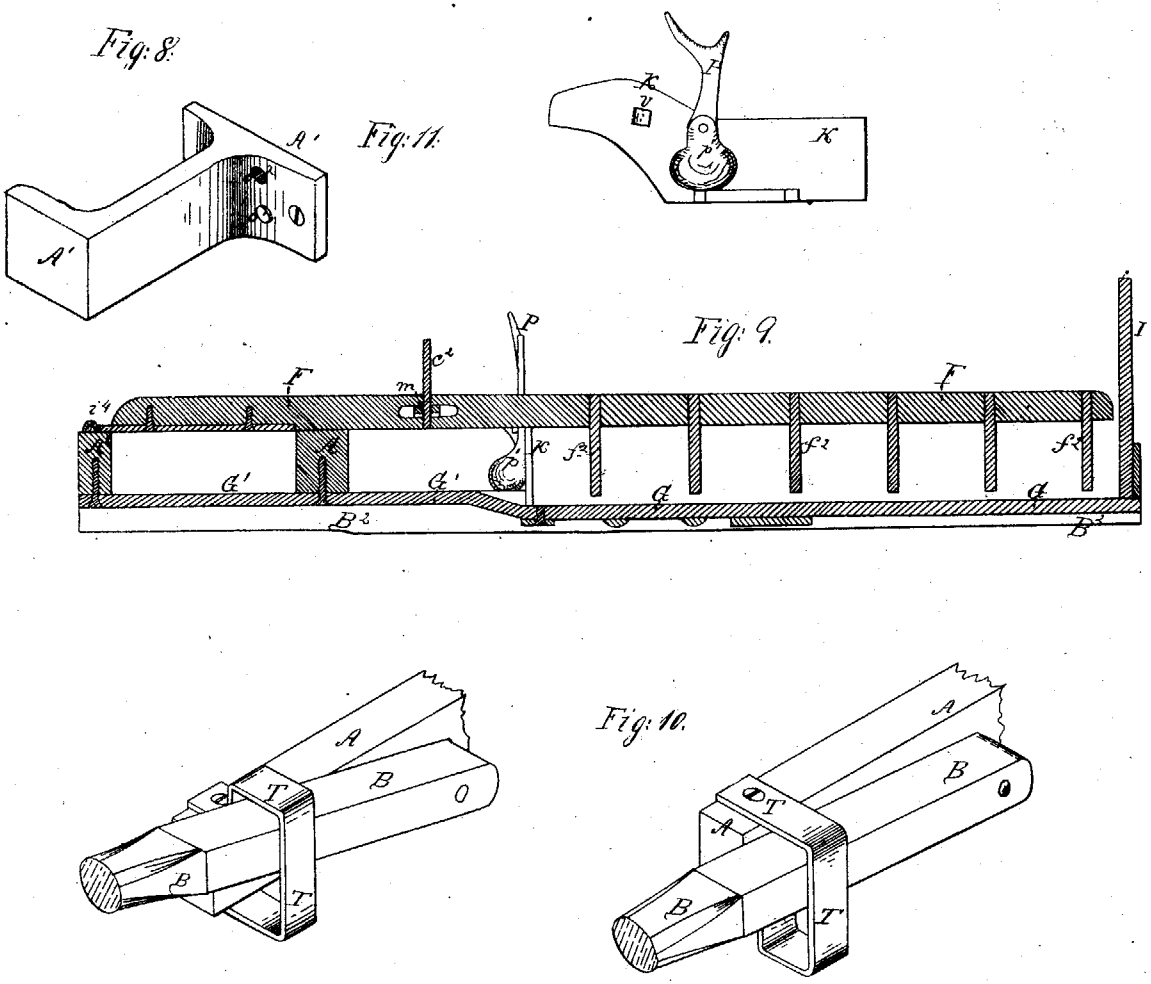
Witnesses:
Rufus Miller
Sol J. Konek
Inventor:
William W. Whiteley Jr.

UNITED STATES PATENT OFFICE.

WILLIAM N. WHITELEY, JR., OF SPRINGFIELD, OHIO.

IMPROVEMENT IN HARVESTING-MACHINES.

Specification forming part of Letters Patent No. 16,131, dated November 25, 1856; Reissue No. 1,203, dated June 25, 1861.

DIVISION B.

*To all whom it may concern:*

Be it known that I, WILLIAM N. WHITELEY, Jr., of Springfield, in the county of Clarke and State of Ohio, have invented various new and useful Improvements in Harvesting-Machines; and I do hereby declare that the following is a full and exact description thereof, reference being had to the accompanying drawings, and to the letters of reference marked thereon.

The object of my invention as a whole is to produce a harvesting-machine which will operate both as a mower and self-raking reaper with the fewest changes (attachments or detachments) possible; and my construction (as hereinafter described) for attaining the objects embraced in my invention will be found to be composed (mainly) of old parts improved in their construction and manner of arrangement in respect or relation to each other, for obtaining both the combined as well as the separate functions of the various parts of which a harvesting-machine is composed in a more advantageous manner than they were attained previous to my invention.

To enable those skilled in the art to make and use my several improvements forming the subject of this division, I will now proceed to describe them and the advantages obtained by them as I have practiced them, referring by letters and figures to the accompanying drawings, forming part of this specification, in which—

Figure 1 illustrates in perspective a harvesting-machine embracing my improvements. Fig. 2 represents a perspective view of one of the sector-plates (which carry the adjustable boxes in which revolves the axle of the main ground and driving wheel) and its center stud or bearing detached. Fig. 3 represents a detached perspective of pinion-shaft, pinion-clutch, and shipper. Fig. 4 represents a vertical longitudinal section through the center of the main driving-wheel. Fig. 5 represents a vertical longitudinal section inside of the main driving-wheel, illustrating more fully the vibrating adjustable sector-plates and adjustable shaft or axle-boxes. Fig. 6 represents a partial duplication of Fig. 5, illustrating by red and black lines the change of pinions by sliding the master-wheel axle-boxes. Fig. 7 represents a vertical cross-section of the master or main ground and driving wheel. Fig. 8 represents a perspective view of connecting-casting. Fig. 9 represents a vertical section at the line 4 4 of Fig. 4. Fig. 10 represents perspective views of tongue-heel and holding or retaining stirrup. Fig. 11 represents side view of rake-arch balance-lever, &c.

Similar letters denote the same parts in the different views.

A and $A^2$ represent the two beams of the main ground-wheel frame. That of A is somewhat larger and extends farther forward for receiving the tongue's retaining-stirrup.

A′ is a cast-iron connecting-piece, by which and screw-bolts at the front end of $A^2$ the beams are connected together.

G is an extension-bar, with a single screw-bolt passing up through it and each of the beams, near their rear ends, whereby they are sustained above it in a very secure manner, so that any shrinking of the beams can be overcome by merely tightening the nuts on the bolts.

Extension-bar G′, after extending out from beam A the proper distance, has a downward set or bend in it, from near which bend its extended part forms the finger-bar G, on which is arranged, in the usual manner, the cutting apparatus, of which the fingers O only are shown. *n* is a brace-rod, the rear end of which is connected to the under side of the bar G′ near its bend, and its front end to beam A, by the bolts $O^3$, which connect the heel of the tongue B to beam A, which brace-rod and the connecting-casting A′, together with the extension-bar G, retain the frame against being forced out of square or in twist.

In beam A there are two holes, O′ and $O^2$, and may be more, one above the other, for bolt $O^3$, for rendering the heel of the tongue vertically adjustable, as is required for enabling the attendant to give the finger-bar a heavy or light bearing on the ground, or keep its bearing the same, when the height of the front of the frame is varied when mowing, and the tongue the same, or vary its angle to that of the frame when reaping, and to the front end of which beam A is secured the tongue's retaining-stirrup T, by which the tongue is retained, and in which it plays freely up and down when the machine is used for mowing, and against the upper end of which stirrup it is held by the driver's weight when in his seat, when used for reaping, which makes the heretofore limber tongue for mowing a rigid one for reaping.

*e* is the box in which the master-wheel pinion-shaft E revolves, and from the end of which, through the proper gears and a crank and pitman, (not shown,) the cutters (also not shown) are vibrated or reciprocated, which is confined to the upper edge of beam A and covered by a corresponding box, each of which extends over the beam toward beam $A^2$.

*f* and $f^2$ are the sector-plates, with a large hole in the small end of each and a series of small holes in their large ends, lying in an arc the center of which is the center of the large holes, and also an inward-projecting flange on the upper edge of each, with two holes, *s s*, in each, and a projecting lip on the inner side of *f*, in which is placed the fulcrum-pin of the shipper *q*, by which pinion *b* is thrown in connection with its clutch-pin, which parts form my improved sector plate or plates, as set forth, which have two novel and useful features—a top flange for receiving the adjustable boxes, whose place may (in some instances) be supplied by making holes for the main ground-wheel axle at various distances from its pinion-shaft, and a lip for the shipper *q*'s fulcrum-pin, which makes a cheaper and much more rigid fulcrum for the shipper than if made separate from the sector-plate.

*r* is pinion *b*'s clutch-pin, which passes through shaft E, between its pinion, when on its shaft, and box *e*, for coupling them together and putting the cutters in motion, as set forth, which improvement is one which will be seen to be very useful, from the fact that the hole in the shaft into which the clutch-pin is placed is reamed out on the outer edges and the pin's ends upset therein, which makes it very tight in the shaft, and the projecting ends larger, which could not be done when it has to be removed for changing pinions.

The shipper-groove in the hub W (see Figs. 1 and 3) and also the clutch-pin slot 2 (see Fig. 3) in the end of the hub of all the pinions to be used on shaft E must be made the same size, so that the pinions will differ only in their size and in the number of their cogs. The small end of the sector-plate *f* is hung and turns on the projecting end of box *e*, and that of *f'* on a short stud, M, (seen at Fig. 2,) when attached to beam $A^2$, in line with shaft E, with their rear ends each attached to its beam by a screw-bolt passed through one of the series of holes, the same one in each sector, and its beam which confines the frame to the sectors, so as to be at the desired distance from the main ground and master-wheel axle, which distance may be varied by the attendant by placing the screw-bolts in a different one of the series of holes. The forked end of shipper *y*, by which pinion *b* is thrown in connection with its clutch-pin *r*, for putting the cutters in motion, and by which (alone) the pinion *b* is retained on its shaft E, is now placed in the groove in hub W and on its fulcrum-pin.

C is the main ground and driving wheel. $a^3$ are its arms; $a^2$, its internal cog-rim; *a*, its internal gear; *c*, its convex connecting-plate, which connects the edge of the internal cog-rim, $a^2$, with the edge of the ground-rim C, and projects farther out than the edge of either or the cogs *a*, for causing the wheel to run with less power applied, protecting the cogs, and for preventing the thin edge of the rim from carrying up the earth and dropping it on the working parts.

U is the hub of the main ground and driving wheel, and D its axle. *g g* are the adjustable boxes in which it revolves, and in which are formed longitudinal slots *i i*, through which pass the bolts *h h* into the holes *s s* in the flanges of the sector-plates *f f'*, for confining said boxes at such various distances from the master-wheel pinion-shaft as will bring the gear *a* properly in mesh with all the various-sized pinions to be used on said pinion-shaft, which changes are fully illustrated by red and black lines at Fig. 6 of the drawings—the small pinion *b* and pitch-circle *c'* in black and the large pinion $b^2$ and pitch-circle $c^2$ in red.

It will now be observed that the main ground-wheel frame can be raised nearer to or lowered farther from the axle of the main ground and driving cog-wheel, and also the axle brought nearer its wheel's pinion-shaft (which always occupies the same position on the frame) or removed farther from it, for bringing gear *a* in mesh with whatever sized pinion will give the cutters the desired number of reciprocations or vibrations. Thus it will be seen that any desired number of vibrations or reciprocations can be given to the cutters by using the proper-sized pinion and varying the distance between the master-wheel axle and its pinion-shaft to suit the pinion used, and also that the distance of the frame from the axle can be varied when desired.

Now, it will be observed that my machine, with the attachment of a dividing-point and swath-board to the end of the finger-bar farthest from the wheel-frame, which I shall hereinafter call the "outer" end, is ready for mowing, with the addition of the usual parts used. (Not shown.) I will therefore remove the dividing-point and swath-board and attach the adjustable parts, which change it into a self-raking reaper.

I is the divider, which is made separate from the finger-bar and platform, and attached to the outer end of the finger-bar by a single screw-bolt.

H is the grain-wheel, attached to the divider a little in front of the finger-bar. N is the reel-post; O and R, reel-braces. The reel is not shown.

B is the platform, which is made separate from and secured (the wide end) to the under edge of that part of the divider in rear of the finger-bar by screw-bolts, and the narrow end to the rear ends and under edges of beams A and $A^2$ by a screw-bolt in each.

K is the rake-arch, curved to suit the circle the rake makes in its raking stroke, with its front end about the same width to or near where the rake-head leaves the platform (when its front end is placed about over the rear end of brace-rod *n*, edge upward on the circle the rake moves) in its raking stroke, from which place its upper edge inclines upward a sufficient distance for raising the rake-teeth out of the gavel which they are discharging without entangling it, and from there backward it inclines a little downward for retaining the rake-head at rest when a gavel of sufficient size is not formed at one revolution of the main ground-wheel. To the curved side of the rake-arch is attached (by a fulcrum-pin) the forked balance-lever P, with a weight, P, at its lower end, which lever is checked in its vibration by its stop *x*.

F is the rake-head, with its inner or center end connected to the upper edge of beam $A^2$ at $i^4$ by a link or universal joint. $f^2$ are its teeth, which occupy nearly the space between its arch and its outer end.

*i* is the crank by which the rake is driven, on the inner side of the large end of which is a hub in which is cut a shipper-groove, and in the outer side of which is cut a clutch-pin slot.

On the extended portion of axle D is placed a coiled spring, which, when crank *l* is placed on the outer end of axle D and a clutch-pin through the axle after the crank is on it near its end, always holds the crank in clutch with its clutch-pin when not held out by its shipper P, the forked end of which fits into the groove in the hub of crank *e*.

M is the pitman by which the motion of crank *i* is transmited to the rake-head, the large end of which pitman surrounds the wrist-pin in the small end of the crank, and the flat end of which passes through a slot in the rake-head, and is there confined by a pin, $c^2$.

L is the driver's seat on its outward inclined leg, $L^2$, which is attached to the connecting-casting A′ by screw-bolts, so that it can be readily removed for using the machine as a mower, by which manner of attachment it has two separate and distinct functions, the first of which is the raising and retaining above the ground the rear end of the wheel-frame and making the heretofore limber tongue a rigid one by merely placing the driver on his seat, (his weight bringing the top of the stirrup T down on the tongue,) as set forth in recital eighth; and it will further be observed that to perform the last-mentioned function the driver's seat has no occasion to project outside of the wheel-frame; and, also, that by having it project outside, as shown and described, the driver's weight, when in his seat, peforms an entirely new function—that of raising and preventing the sag in the finger-bar, as well as that of raising and retaining the rear end of the wheel-frame, by which arrangement the machine is given more power, the side draft diminished, and the entire machine caused to run lighter; and it will be still further observed that, were the self-rake removed and a man placed on the wheel-frame for removing the gavels, the attachment of my adjustable driver's seat, as described, would perform the same functions as with a self-rake, and therefore I do not wish to limit its use to a combined self-raking reaper and mower, the design of placing the driver's weight in a certain position in relation to the bearing of the main ground-wheel on the ground being for accomplishing the hereinbefore-described advantages, and not the peculiar manner of so placing it. It is obvious that it might be made to occupy the same position connected to the frame in a different manner than that practiced by me, which I have found to work well.

The operation of my improved self-raker for harvesting-machines is as follows: Suppose a sufficient quantity of cut grain on the platform for a gavel, the rake-teeth just dropped into the butts thereof by the weighted lever P, which carries the rake forward over the cut crop, and the crank *i* just passing its dead-center in front (as the machine moves forward) and moving the rake backward and from the standing crop, (the teeth in an arc,) and the head parallel with the platform to or near its rear edge, and from there up the incline of arch K, by which movement the rake-teeth are raised out of the gavel, being discharged by them without entangling it—a thing which could not be done were there no incline arch or its equivalent for raising the rake-teeth out of the gavel at about the time it leaves the platform. This feature alone of my invention is of great value, were there no other functions performed by my improved self-rake, and therefore the parts which produce said movement will be claimed in a separate combination from those which perform other functions.

The second distinct function of my self-rake will be seen in the points of the teeth, which teeth move in an arc over the platform, the center of which is farther from the standing crop than the platform, moving faster than their other end, by which movement the teeth, when starting the gavel from the platform, are less liable to breakage on account of their points standing forward a little, which permits them to slip in the uncut grain, (should they engage with it,) and, when leaving the gavel and platform, be at different angles to them than when starting the gavel, and by which, also, the gavel leaves them more freely without becoming entangled by them than it would otherwise do.

The third function of my improved self-rake will be seen in the rake moving in an arc the center of which is farther from the standing crop than the platform, and increasing in velocity from where the teeth enter the gavel to about where they leave it. By this arrangement the liability of the rake to be broken by taking hold of the tangled uncut crop is entirely prevented, which is a great desideratum and one of the main features in my self-rake.

Having thus fully described the construction and operation of those parts or functions of my invention claimed in this division, what I claim as my invention, and desire to secure by Letters Patent, is—

1. In combination with the main ground-wheel frame of a harvesting-machine, the sector-plates *f f'*, provided with the adjustable boxes *g g'*, or their equivalents, substantially as shown and described, for the purposes specified.

2. In combination with the sector-plate *f*, a projecting lip for the shipper's fulcrum-pin, substantially such as shown and described, for the purposes specified.

3. Retaining the pinion on its shaft by means of the shipper or its equivalent, by which said pinion is thrown in and out of connection with its clutch-pin, substantially as shown and described, for the purpose stated.

4. So connecting or combining the driver's seat of harvesting-machines with the front end of the frame of the same (when used for reaping) that when the driver is on his seat his weight will do either, raise and hold up the rear end of the wheel-frame (to which the cutting-up harvesters are connected) or both the rear end of the frame and the center of the finger-bar, for the purposes specified.

In testimony whereof I have hereunto set my hand this 19th day of March, 1859.

WILLIAM N. WHITELEY, JR.

Witnesses:
REUBEN MILLER,
SOL J. HOUCK.